Figure 1:
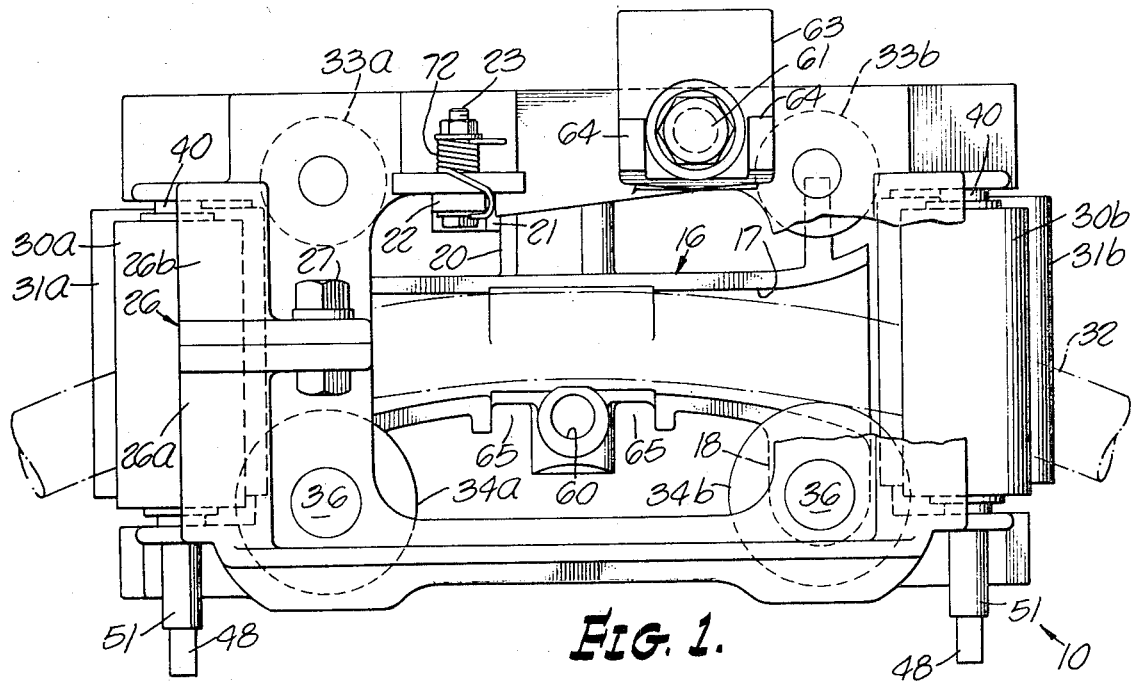

United States Patent [15] 3,640,504

Lindsey [45] Feb. 8, 1972

[54] POWER CONDUCTOR STRINGING ASSEMBLY

[72] Inventor: L. E. Lindsey, 222 Vista Ave, Pasadena, Calif. 91107

[22] Filed: July 30, 1969

[21] Appl. No.: 845,960

[52] U.S. Cl. ...................................254/134.3PA, 254/194
[51] Int. Cl. ..........................................................E21c 29/16
[58] Field of Search.............254/134.3 PA, 134.3, 190, 193, 254/194

[56] References Cited

UNITED STATES PATENTS

| | | | |
|---|---|---|---|
| 2,590,645 | 3/1952 | Petersen | 254/134.3 PA |
| 2,946,559 | 7/1960 | Pickett | 254/194 X |
| 2,949,279 | 8/1960 | Eitel | 254/190 |
| 3,130,958 | 4/1964 | McAuley | 254/134.3 PA |
| 3,235,228 | 2/1966 | Lindsey | 254/134.3 PA |
| 3,326,529 | 6/1967 | Migeot et al. | 254/193 |

FOREIGN PATENTS OR APPLICATIONS

| | | | |
|---|---|---|---|
| 714,317 | 8/1954 | Great Britain | 254/134.3 PA |
| 737,813 | 10/1955 | Great Britain | 254/134.3 PA |
| 32,837 | 12/1960 | East Germany | 254/134.3 PA |

*Primary Examiner*—Theron E. Condon
*Assistant Examiner*—Roscoe V. Parker, Jr.
*Attorney*—Sellers and Brace

[57] ABSTRACT

An article of manufacture for use in installing a power conductor along a power line while the conductor is being pulled across the outer end of installed insulators and supported closely above conductor clamping means carried by each insulator. When the conductor has been pulled into position antifriction supports therefor are released allowing the conductor to gravitate directly into the clamp seating channel without need for lifting the conductor. The stringing assembly and the insulator-supported clamping unit are designed for interlocking assembly during the stringing operation and the stringing assembly unit is thereafter readily separable from the clamping unit without need for tools.

22 Claims, 6 Drawing Figures

INVENTOR
L. E. LINDSEY
BY
ATTORNEYS

INVENTOR
L. E. LINDSEY
BY
ATTORNEYS

POWER CONDUCTOR STRINGING ASSEMBLY

This invention relates to power line conductor stringing facilities and more particularly to an improved method and apparatus designed to be mounted temporarily on the outer end of the insulator while supporting the conductor free of but ready to gravitate into the seating channel of a clamping unit.

The installation of long heavy power conductors to the free ends of insulators supported by power line poles, towers or the like presents many problems for which there have been numerous proposals. Resort has been had to many expedients for pulling the conductor lengthwise of the power line while supporting it close to the free end of the insulator. Thereafter the heavy and properly tensioned conductor must be transferred into the clamping means and secured in place. This can be an arduous and hazardous task using stringing equipment and procedures previously proposed.

To avoid the risks and the numerous disadvantages characterizing previous stringing operations there is provided by this invention a simple stringing block assembly and a companion conductor clamping unit designed to be supported in superimposed relationship directly on the outer end of a powerline insulator. The clamping unit is secured to the insulator in conventional manner and a stringing block assembly is contoured to interlock with structural features of the conductor-clamping unit with the conductor stringing passage of the block located above and in general alignment with the seating channel in the clamping unit. The conductor is then pulled along the powerline through the similarly equipped insulator at each pole or tower following which the conductor supporting rollers extending crosswise of the opposite ends of the stringing unit are released allowing the conductor to drop into the seating channel. The release of simple latch means then frees the stringing block for removal after which the conductor clamping jaw is tightened against the conductor.

The stringing block is designed to hold the conductor in alignment with the clamp seating channel despite curves in the power line and irrespective of the direction or degree of curvature. To this end the stringing block is provided with a pair of heavy duty lateral restraint rollers at its opposite ends, the rollers additionally cooperating to hold the conductor straight throughout the length of the seating channel to facilitate transfer of the conductor into the channel. In the interests of minimum weight and cost, these roller guides are restricted to one side of the stringing block which is designed to be supported on the insulator with the guide rollers on that side of the line toward which the conductor curves.

Accordingly, it is a primary object of the present invention to provide an improved method and apparatus for stringing powerline conductors and for transferring them into the clamping unit at the end of the stringing operation.

Another object of the invention is the provision of an improved simple rugged stringing block assembly designed for support on the outer end of a powerline insulator and readily detachable therefrom at the end of the stringing operation without need for tools.

Another object of the invention is the provision of a mutually cooperating conductor-clamping unit and a stringing block temporarily securable thereto.

Another object of the invention is the provision of a conductor-clamping unit and a stringing block assembly securable to the outer end of an insulator prior to the installation of a conductor, the clamping unit remaining mounted on the insulator and employed to secure the conductor in place thereon at the end of the stringing operation and the stringing block assembly being removable.

Another object of the invention is the provision of a conductor stringing block assembly designed for interlocking engagement with a conductor-clamping unit mounted on an insulator and serving to hold the conductor aligned with but out of contact with the clamp seating channel until the conductor is in proper position lengthwise of the line.

Another object of the invention is the provision of a conductor stringing block assembly designed to hold the conductor straight and accurately aligned with the clamped seating channel despite the direction or degree of curvature in the line.

Another object of the invention is the provision of a conductor stringing block assembly equally suitable for use with rigidly supported insulators of a wide variety and whether mounted vertically, horizontally or at some intermediate angle.

Another object of the invention is the provision of a conductor-clamping unit securable to the outer end of an insulator and designed to interlock with a suitably designed cooperating stringing block assembly.

These and other more specific objects will appear upon reading the following specification and claims and upon considering in connection therewith the attached drawing to which they relate.

Figure 5:
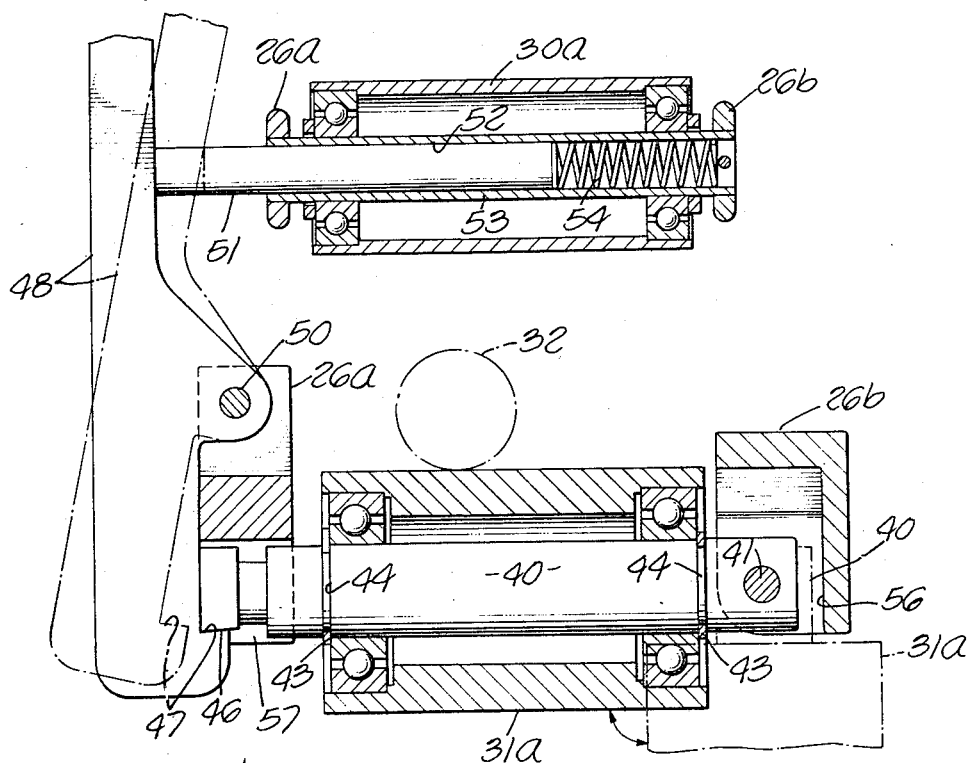
Figure 2:
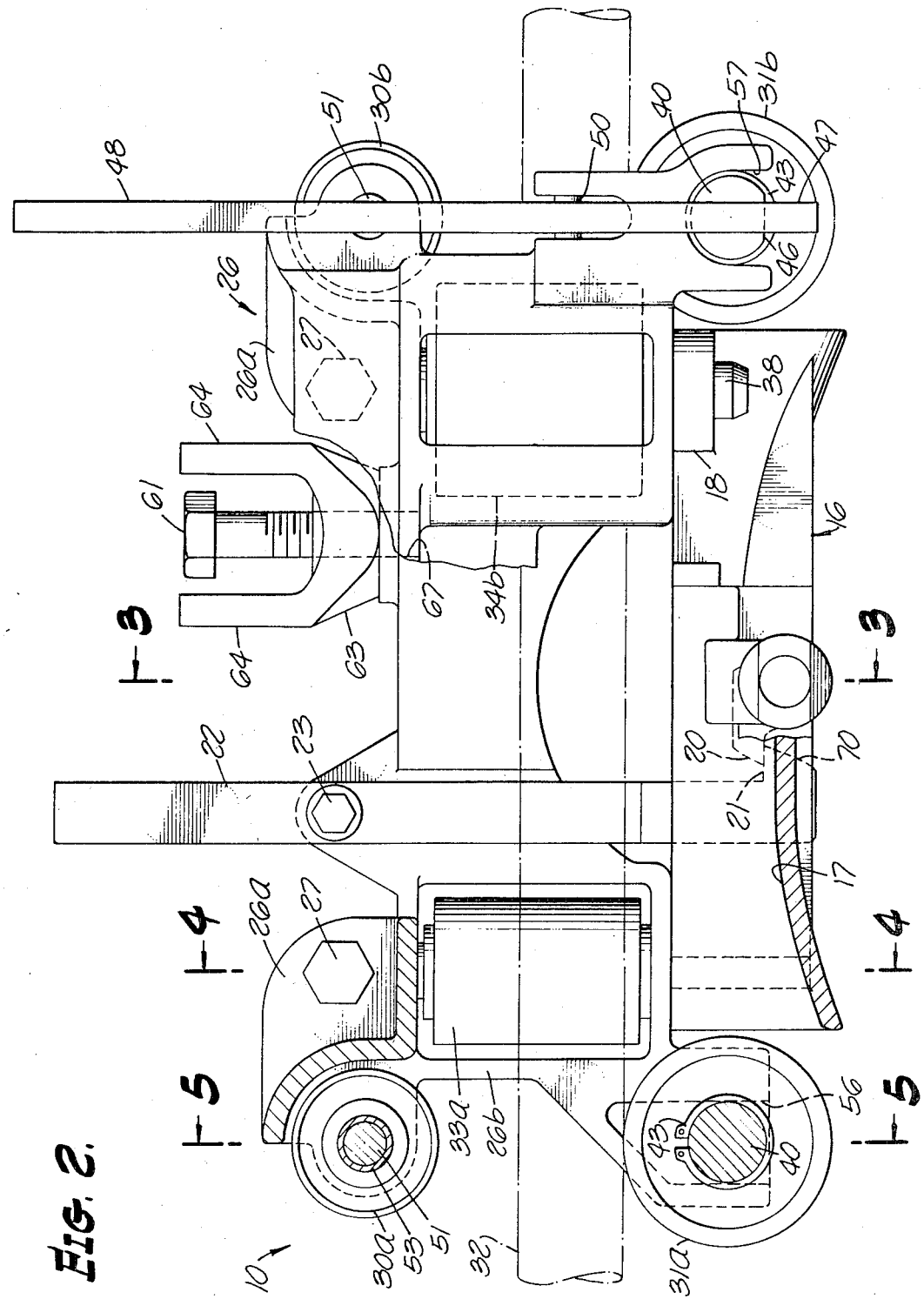
Figure 3:
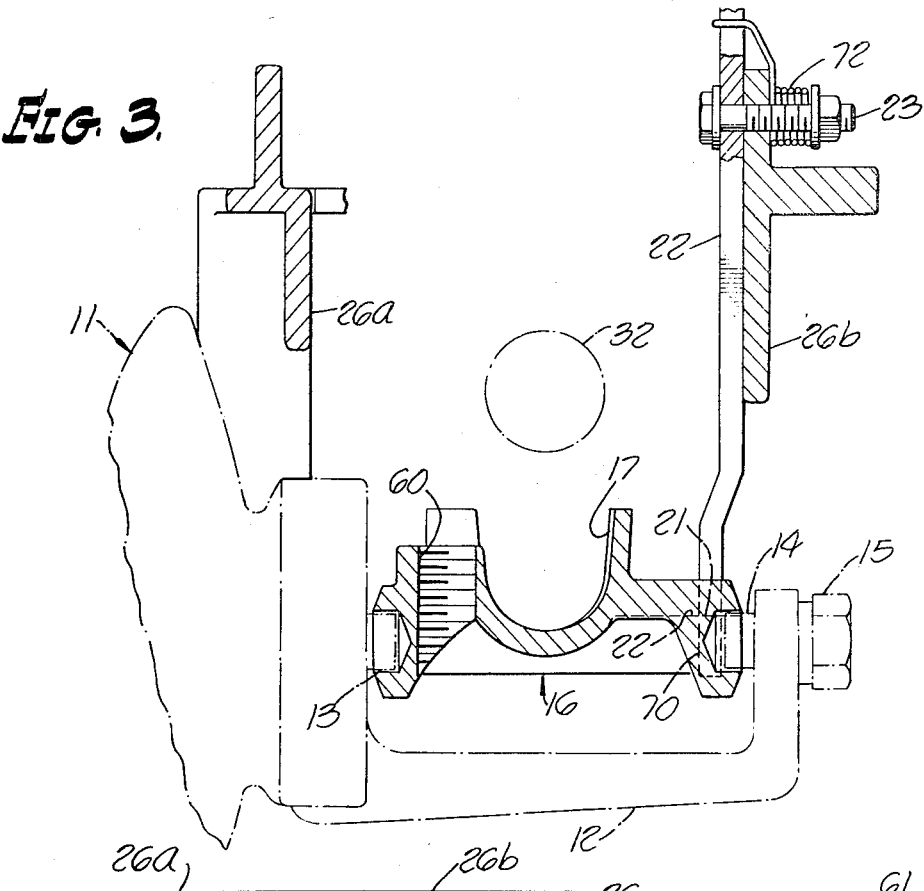
Figure 4:
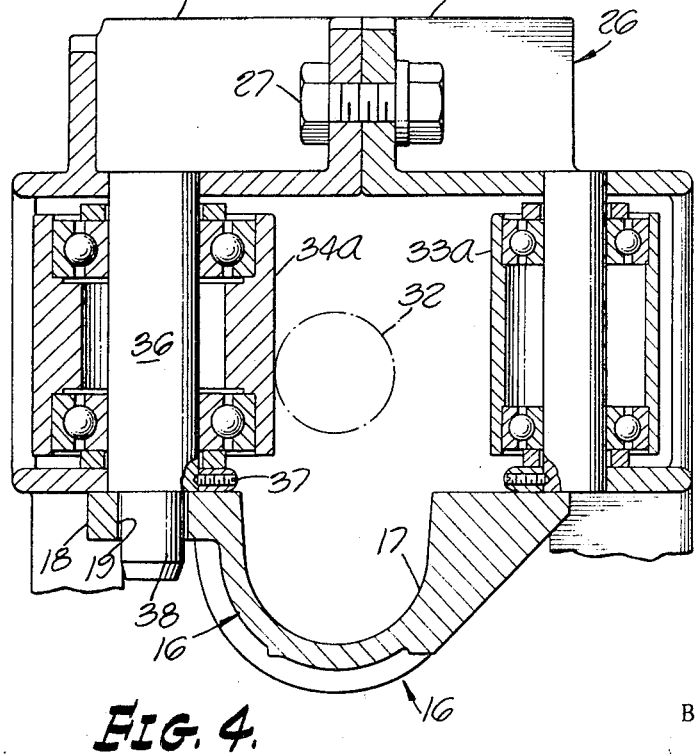
Figure 6:
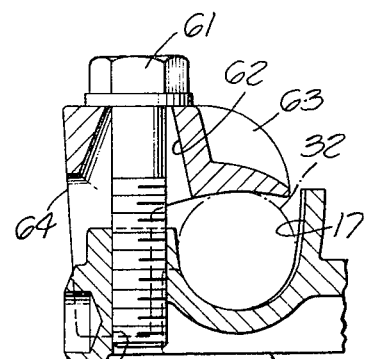

Referring now to the drawing in which a preferred embodiment of the invention is illustrated:

FIG. 1 is a top plan view of a preferred embodiment of the invention stringing block assembly attached to an open conductor-clamping unit;

FIG. 2 is a side elevational view on an enlarged scale taken from the lower side of FIG. 1 and showing portions broken away; FIGS. 3, 4 and 5 are fragmentary cross-sectional views taken along lines 3—3, 4—4 and 5—5 on FIG. 2; and FIG. 6 is a transverse vertical sectional view through the conductor-clamping unit at its midlength and showing the clamping jaw in assembled position.

The invention conductor stringing block assembly, designated generally 10, is designed for use in stringing a single power conductor while the assembly is supported directly on the outer end of the insulator to which the conductor is to be secured. Assembly 10 is particularly suitable for use with rigidly supported insulators of either the upright or horizontal type, a fragmentary view of the outer free end 11 of the latter type being generally indicated in dot-and-dash lines in FIG. 3. If of the horizontal type, there is fixed to the outer end of insulator 11 a U-shaped bracket 12 well known to workers in this field. The inner cap end of such brackets is provided with an integral trunnionlike stud 13 aligned with the similarly sized end 14 of a cap screw 15 mounted in the outer leg of bracket 12.

Pivotally supported between stud 13 and cap screw 14 is a conductor-clamping unit, designated generally 16. This clamping unit has certain novel features but is otherwise generally similar to conductor-clamping units well known in the power line art. If insulator 11 is of the upright type, then the bight portion of clamp 12 extends crosswise of the upper end of the insulator with the bracket legs projecting upwardly from the rim portions of the mounting cap so as to support the clamping unit 16 crosswise of the insulator end.

An understanding of the unique features of clamping unit 16 will facilitate an understanding of the stringing block assembly. It will be understood that one lateral sidewall of conductor seating channel 17 is provided with a pair of horizontally projecting lugs 18, 18 there being one lug at either end of unit 16 each provided with a vertical opening 19. Each of these holes seats a stud projecting downwardly from the stringing block assembly, as will be described in greater detail presently. Another special feature of clamping unit 16 is best shown in FIG. 2 and comprises an integral lug 20 located on the opposite side of the cable seating channel 17 from lugs 18, 18 and generally at the midlength of the clamping unit. The underside of lug 20 is engageable by a keeper latch 21 having an operating handle 22 pivoted to the main body of the stringing block by pivot pin 23, and urged counterclockwise as viewed in FIG. 2 by a torsion spring 72 (FIG. 3).

Stringing block assembly 10 has a main frame 26 formed by two castings 26a, 26b secured together at their opposite ends by bolts 27 (FIGS. 1 and 4). Castings 26a, 26b are made of high-strength lightweight alloy with the metal distributed for maximum strength and minimum weight. The two castings 26a, 26b support upper and lower pairs of transverse rollers 30a, 30b and 31a, 31b best shown in FIG. 2. Upper rollers 30a, 30b function primarily as retainer rollers whereas the larger heavier duty rollers 31a, 31b carry the principal weight of the conductor 32. In addition there are two pairs of vertically disposed rollers journaled in the opposite ends of main frame 26, best shown in FIG. 1, namely, rollers 33a, 33b and the relatively larger and heavier-duty rollers 34a, 34b. The described four pairs of rollers cooperate in forming a stringing tunnel through which conductor 32 extends while being pulled into its installed position along the powerline. As is made clear by FIGS. 2 through 5, conductor 32 is supported above and in general alignment with seating channel 17 of clamping unit 16 and is maintained in this elevated position until pulled into its fully installed position and properly tensioned. Thereafter it is released and allowed to gravitate into seating channel 17 in a manner to be described presently. As is made clear by FIGS. 4 and 5, all rollers preferably include antifriction bearing supports carried by shafts mounted in frame members 26a, 26b. Certain of these shafts are of special construction as will now be described.

Referring to FIG. 4, it is pointed out that the heavy duty rollers 34a are mounted on shafts 36 secured to frame 26a by setscrew 37. The reduced lower end portion 38 of each shaft projects downwardly beyond the adjacent portion of frame 26a and is sized and positioned to seat in one of the openings 19 formed in a lug 18 projecting from one lateral sidewall of the conductor-clamping unit 16.

Referring now to FIG. 5 it will be recognized that the lower transverse pair of rollers 31a, 31b are mounted on shafts 40 having one end pivotally secured to main frame member 26b by a pivot pin 41. Rollers 31a are held in position on shaft 40 by split ring keepers 43, 43 seating in retainer grooves 44. The left-hand end of shaft 40, viewed in FIG. 5, is flattened at 46 to provide an engaging surface for latch 47 carried by an operating lever 48 pivoted to main frame 26a by pin 50. Latch lever 48 is normally biased to latching position by means including a pin 51 loosely and slidably supported in a tubular shaft 53 supporting the upper transverse rollers 30a, 30b. Pin 51 is urged outwardly against latch lever 48 by compression spring 54.

It is pointed out that the opposite ends of shaft 40 supporting the lower transverse rollers 31a, 31b project into downwardly opening U-shaped channels 56, 57 respectively, permitting the shaft to swing through a 90° arc in a vertical plane. The normal conductor supporting position of the rollers is shown in full lines in FIG. 5, whereas the release position of these rollers in which the conductor is allowed to drop into seating channel 17 is indicated by the dot-and-dash lines in this same Figure.

Referring to FIGS. 3 and 6, it is pointed out that the conductor seating unit 16 is provided with a threaded bore 60 for a cap screw 61. This cap screw extends downwardly through a flaring bore 62 formed in the conductor clamping jaw 63. This jaw includes a pair of lugs 64 positioned to either side of cap screw 61 and adapted to extend downwardly into a pair of notches 65, 65 (FIG. 1) opening outwardly from one sidewall of conductor seating unit 16. When the stringing block is mounted on the channel seating unit, clamping jaw 63 is detached, inverted and held captive on the upper edge of frame member 26b in the manner illustrated in FIGS. 1 and 2. For this purpose the upper edge of the frame is provided with a threaded bore 67 to receive cap screw 61. In this manner, the clamping jaw 63 is held captive in the vicinity of the insulator and its seating unit 16. After the conductor has been strung and released into channel 17, the stringing block assembly 10 is released in a manner to be described and jaw 63 is then transferred to clamping unit 16 and tightened to clamp the conductor firmly in place in channel 17.

OPERATION

The mode of utilizing the described stringing block assembly will be quite evident from the foregoing detailed description of its components and their relationship to one another. Before installing stringing block assembly 10 on seating unit 16, clamping jaw 63 is removed and mounted along the top edge of the stringing block in the manner described above and illustrated in FIGS. 1 and 2. The assembly of the stringing block to seating unit 16 is then accomplished merely by lowering assembly 10 over the seating unit with locator pins 38 (FIG. 4) aligned with a respective one of openings 19 in lugs 18. As this operation is performed the cammed nose 70 of latch 21, 22 cams over the similarly shaped upright edge of detent lug 20 (FIG. 2) until latch 21 seats beneath lug 20 under the urging of torsion spring 72 (FIG. 3). This spring is quite stiff and firmly holds latch 21, 22 engaged beneath lug 20 thereby locking the stringing assembly 10 to seating unit 16.

If the particular insulator on which the stringing assembly is to be mounted is located at a curve in the powerline, then it is desirable and important that the heavy duty vertical pair of rollers 34a, 34b be located on the inside of the curve as shown in FIG. 1. This is accomplished by making certain that lugs on conductor seating unit 16 project from the inner side of the curve. To permit this, seating unit 16 is designed for support in the insulator mounting bracket 12 with its lugs 18 facing in either lateral direction, and accomplished by rotating unit 16 through 180° in a horizontal plane, if necessary, for lugs 18 to face in the desired direction. Stringing block assembly 10 is then similarly rotated, if necessary, to have locator pins 38 positioned to seat in openings 19 of lugs 18.

The hauling line for the conductor to be installed is attached to the advance end of conductor 32 and passed in succession through the stringing tunnels of stringing blocks 10 mounted on each insulator along the powerline. The lead end of this line is attached to suitable winch equipment and used to haul the line and the attached conductor into place. Throughout this operation both the haul line and the conductor itself is supported on the lower transverse pair of rollers 31a, 31b with some lateral support being provided by upright pairs of rollers 33a, 33b 34a, 34b. Along straight sections of the powerline these rollers carry no particular load. However, along curved portions of the line, rollers 34a, 34b are under very considerable stress and for this reason are of substantially heavier construction and are so positioned as to support the conductor in proper position for transfer into seating channel 17 at the end of the stringing operation. The manner in which this is accomplished is best illustrated in FIG. 1.

Lowering the strung and properly tensioned cable into the seating channel is accomplished readily and without tools by an operator climbing the pole and releasing latches 48, 48. Desirably this is done in succession allowing the associated one of the lower rollers 31a, 31b to pivot downwardly about pins 41 and allowing the conductor to gravitate into channel 17. This operation opens the lower side of the stringing tunnel through assembly 10 thereby permitting the assembly to be detached from channel 16 merely by lifting it upwardly while holding latch lever 22 pivoted to its unlatched position. Clamping jaw 63 is then removed from its captive position on assembly 10, inverted and secured in place over the conductor. The stringing assembly is now lowered to the ground and is available for further stringing operations.

While the particular power conductor stringing assembly herein shown and disclosed in detail is fully capable of attaining the objects and providing the advantages hereinbefore stated, it is to be understood that it is merely illustrative of the presently preferred embodiments of the invention.

I claim:

1. A power conductor stringing assembly for use in supporting a power conductor closely adjacent an insulator-supported clamp therefor while the conductor is being pulled into place along a power line, said stringing assembly comprising a main frame having means for coupling the same firmly and temporarily on an insulator on which a power conductor is to be clamped, means including a plurality of roller means journaled on said main frame and cooperating to support and retain the conductor loosely captive at a level above the insulator-supported clamp while being pulled into place along the power line, and means for releasing the conductor from between said rollers for transfer by gravity into said insulator-supported clamp without disturbing the firm coupling of said stringing assembly on the insulator.

2. A stringing assembly as defined in claim 1 characterized in the provision of means for clamping said main frame releasably to conductor support means carried at the outer end of said insulator.

3. A stringing assembly as defined in claim 1 characterized in the provision of quick release means movably mounted on said main frame and cooperating with detent means on the conductor support carried by said insulator to lock said stringing assembly securely to said insulator so long as said assembly is needed for stringing a conductor into position along a powerline.

4. A stringing assembly as defined in claim 1 characterized in that said assembly is selectively clampable in its proper operating position at the outer end of an insulator in either of two alternate positions located 180° apart depending on whether the conductor being pulled therethrough is moving along a curve to the right or to the left of a vertical plane through the longitudinal axis of said main frame.

5. A stringing assembly as defined in claim 1 characterized in that said rollers means includes separate rollers extending crosswise beneath and upright along either lateral side of the path along which the power conductor is pulled.

6. A stringing assembly as defined in claim 5 characterized in the provision of means for releasing said rollers means underlying the conductor leaving the conductor free to drop by gravity into said insulator-supported clamp.

7. A stringing assembly as defined in claim 1 characterized in that said roller means includes independent rollers extending crosswise of the lower opposite ends of said main frame with their upper sides on a level above said insulator-supported clamp and mounted on axle means, means holding said last mentioned rollers and axle means captively assembled to said main frame and including means for releasing said rollers to move out of supporting engagement with a conductor and allowing the latter to gravitate into the insulator-supported clamp.

8. A stringing assembly as defined in claim 7 characterized in that said means holding said axle means captively assembled to said main frame includes means pivotally connecting one end of said axle means to said main frame, and means carried by said main frame for holding the opposite end of said axle means detachably secured thereto normally.

9. A stringing assembly as defined in claim 8 characterized in that said last named means comprises manually operable latch means movable to a position releasing said axle means for movement out of conductor supporting position.

10. A stringing assembly as defined in claim 9 characterized in that said axle release means is constructed and arranged to release the rollers supported thereby selectively in out of phase relationship and substantially simultaneously at the option of the user.

11. In combination, a conductor-clamping unit having means for securing the same to the outer end of an insulator and including an upwardly facing channel-shaped main body for seating a conductor and adjustable conductor clamping means mounted thereon, a conductor stringing assembly having means for holding the same detachably assembled to the main body of said clamping unit and above the conductor seating channel thereof while a conductor is being pulled into position along a powerline, said stringing assembly including means for holding a conductor in place above and generally aligned with said seating channel including antifriction means extending transversely of the lower side of the conductor.

12. The combination defined in claim 11 characterized in that said clamping unit and said stringing assembly have mutually cooperating means for holding the same detachably assembled and including movable release means mounted on one thereof and engageable with means carried by the other one thereof.

13. The combination defined in claim 11 characterized in that said means for holding said clamping unit and said stringing assembly detachably assembled includes internesting boss and recess means on adjacent portions of said clamping unit and stringing assembly.

14. The combination defined in claim 13 characterized in that said holding means between said clamping unit and said stringing assembly includes quick release means movable between locked and unlocked positions in the latter of which said boss and recess means can be moved into and out of internesting relation to one another.

15. The combination defined in claim 11 characterized in that said clamping unit and said stringing assembly include complementally shaped interfitting juxtaposed portions cooperating in the assembled position thereof to hold said stringing assembly aligned with said seating channel.

16. The combination defined in claim 11 characterized in that said clamping unit includes aligned mounting means transversely of the midportion of said conductor seating channel and adapted to mate with means for holding said clamping unit secured to the outer end of an insulator.

17. The combination defined in claim 16 characterized in that said clamping unit mounting means are formed in such a manner that the clamping unit can be mounted on a given fixed insulator with one end of said seating channel facing selectively forwardly and rearwardly along the power line at the user's option.

18. The combination defined in claim 11 characterized in that said stringing assembly includes a main frame substantially longer than said clamping unit and formed on the lower side thereof to seat against the opposite lateral edges of said seating channel, roller means extending crosswise of the opposite lower corners of said main frame and normally held in position to support a conductor being pulled along a power line on a level closely spaced above and in generally vertically aligned position with the seating channel of said clamping unit.

19. The combination defined in claim 18 characterized in the provision of means for releasing said roller means to drop a strung conductor into said seating channel.

20. The combination defined in claim 19 characterized in that said roller means and said main frame are so constructed that said stringing assembly and release rollers are withdrawable as a unit from a strung conductor after the latter has been dropped into said seating channel.

21. That method of installing a power conductor on insulators carried by support means spaced along a powerline which comprises, mounting a conductor clamping unit on the outer end of an insulator with the seating channel thereof facing upwardly, detachably clamping a stringing assembly unit to said clamping unit with the conductor support tunnel thereof located closely above and aligned with the conductor seating channel in said clamping unit, pulling the conductor along the powerline while held captive within the support tunnel of said stringing assembly, lowering the strung conductor into said seating channel, and thereafter detaching the stringing assembly unit from said clamping unit and clamping the conductor firmly and securely in said seating channel.

22. That method defined in claim 21 characterized in the step of supporting said conductor clamping unit on the outer end of the insulator with limited freedom to pivot in a vertical plane lying generally in the longitudinal center line of the insulator, and resting said stringing assembly against the upper lateral edges of said conductor seating channel, and supporting a conductor within said stringing assembly at a level out of contact with said seating channel while being pulled therethrough and along a power line and until the conductor has been pulled into its intended installed position, and thereafter dropping the conductor into a position of rest against the bottom of said seating channel.

* * * * *